United States Patent [19]
Hoch

[11] 3,893,569
[45] July 8, 1975

[54] THERMOS SUPPORT TRAY

[76] Inventor: Frank R. Hoch, 200 Garcia, Trinidad, Colo. 81082

[22] Filed: Mar. 21, 1974

[21] Appl. No.: 453,268

[52] U.S. Cl.................................. 211/74; 108/44
[51] Int. Cl.².......................................... A47B 85/00
[58] Field of Search............ 224/42.42 R, 42.45 R; 211/75, 74; 5/94; 108/44; 248/188.4

[56] References Cited
UNITED STATES PATENTS

| | | | |
|---|---|---|---|
| 2,711,545 | 6/1955 | Moore | 5/94 X |
| 2,897,974 | 8/1959 | Cook | 211/74 |
| 2,899,162 | 8/1959 | Young | 248/154 X |
| 2,926,828 | 3/1960 | Kuddie | 211/75 X |
| 2,986,438 | 5/1961 | Smathers | 108/44 UX |
| 3,002,665 | 10/1961 | Allen | 224/42.42 R |
| 3,436,770 | 4/1969 | Turner | 5/94 X |
| 3,693,555 | 9/1972 | Holtzmann | 108/48 X |

*Primary Examiner*—Roy D. Frazier
*Assistant Examiner*—Robert W. Gibson, Jr.
*Attorney, Agent, or Firm*—Howard I. Podell

[57] ABSTRACT

A tray which is attachable in an automobile about the automobile floor hump. The tray is fitted with a shaped support to hold one or more thermos jugs, and with a pair of adjustable length legs.

1 Claim, 4 Drawing Figures

THERMOS SUPPORT TRAY

SUMMARY OF THE INVENTION

My invention relates to a support tray which may be secured about the center floor hump of an automobile, and particularly a tray which will securely hold a thermos jug in place. The tray is fitted with a pair of adjustable legs and with a shaped shelf of a size to fit about a conventional thermos jug.

BRIEF DESCRIPTION OF THE DRAWING

The objects and features of the invention may be understood with reference to the following detailed description of an illustrative embodiment of the invention, taken together with the accompanying drawings in which.

Figure 1:
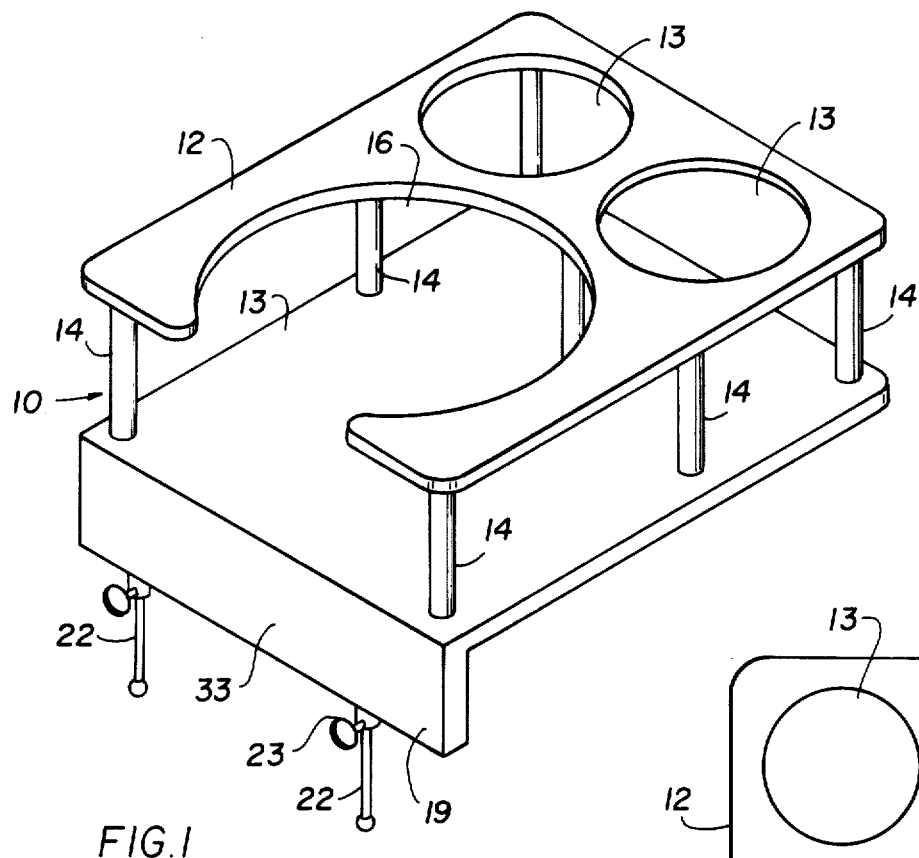
FIG. 1 illustrates a perspective view of the invention.
Figure 3:
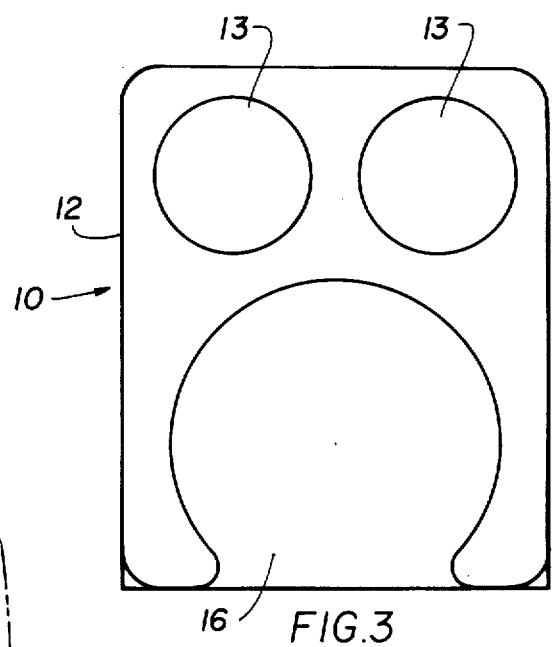
FIG. 3 illustrates a plan view of the invention.
Figure 2:
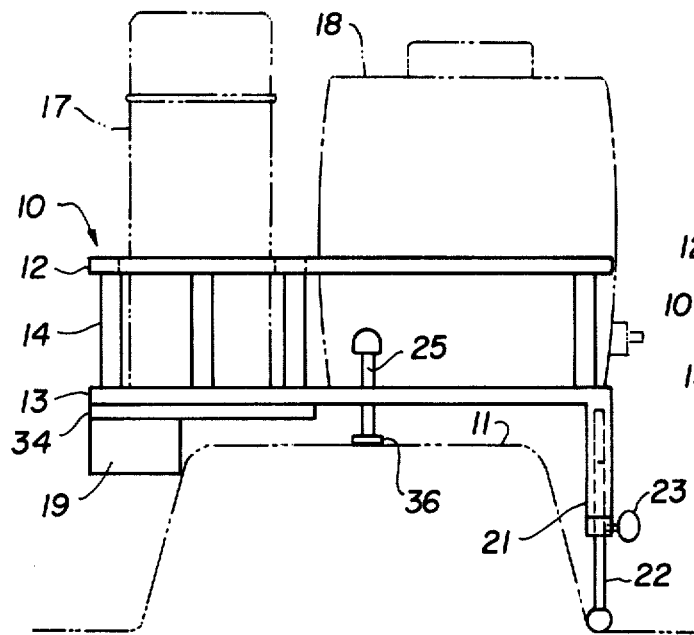
FIG. 2 illustrates an elevation view of the invention in use.
Figure 4:
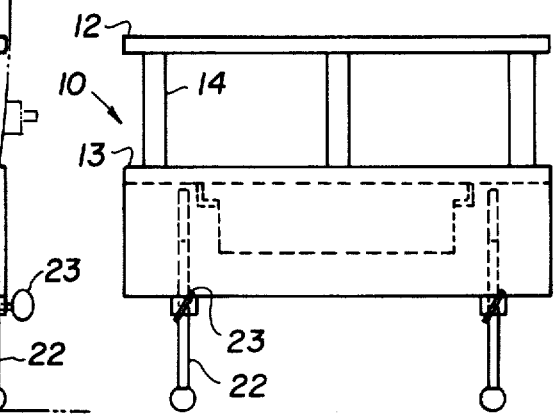
FIG. 4 illustrates a side view of the invention.

DESCRIPTION OF THE PREFERRED EMBODIMENT:

Turning now descriptively to the drawings, in which similar reference characters denote similar elements throughout the several views, FIGS. 1–4 show a thermos support tray 10 which secures about the center floor hump 11 in an automobile. The thermos support tray 10 is composed of two parallel plates 12 and 13 connected to each other by a plurality of posts 14. The upraised plate 12 is formed with two small circular holes 15, each of a 3.875 inch diameter to hold a conventional quart size thermos jug 17 in place and one large circular hole 16 to secure a gallon thermos jug 18, when the secured jugs rest on the base plate 13.

A pair of adjustable telescopic legs 22 are mounted to the underside of the base plate 13 through individual holes 21 in side flange 33 of the plate 13. The legs 22 may be each fastened to a specific extended length by a thumbscrew 23 threaded to a collar 26 fitting about each leg 22 and fastened to side flange 33. A flange member stop bracket 19 is fitted under the side 34 of the plate 13 opposite to the side flange 33 for fitting about the side of the automobile floor hump 11. An adjustable leg 25 is threadably fastened through the center of base plate 13 for resting on the midsection 36 of the floor hump 11.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A support structure adaptable for mounting about the floor hump of an automobile and shaped to support one or more thermos jugs comprising a base plate mounted by posts to a parallel shelf plate, said base plate fitted along the underside of a first edge with a pair of telescopic legs of adjustable length, said base plate fitted on the underside of a second edge with a stop bracket, said shelf plate fitted with cut-outs of a circular shape of a size to each retain a jug in place that is resting on the base plate, together with a threaded adjustable length leg which is threadably fastened through the central section of the base plate.

* * * * *